(12) United States Patent
Py et al.

(10) Patent No.: US 7,641,715 B2
(45) Date of Patent: Jan. 5, 2010

(54) COMPOSITE MATERIAL AND USE THEREOF FOR CONTROLLING THERMAL EFFECTS IN A PHYSICOCHEMICAL PROCESS

(75) Inventors: Xavier Py, La Tour Bas Elne (FR); Vincent Goetz, Pollestres (FR)

(73) Assignee: Centre National de la Recherche Scientifique, Paris (FR)

( * ) Notice: Subject to any disclaimer, the term of this patent is extended or adjusted under 35 U.S.C. 154(b) by 520 days.

(21) Appl. No.: 10/536,723

(22) PCT Filed: Nov. 24, 2003

(86) PCT No.: PCT/FR03/03463

§ 371 (c)(1), (2), (4) Date: May 27, 2005

(87) PCT Pub. No.: WO2004/050789

PCT Pub. Date: Jun. 17, 2004

(65) Prior Publication Data

US 2006/0101997 A1     May 18, 2006

(30) Foreign Application Priority Data

Nov. 27, 2002   (FR) .................. 02 14888

(51) Int. Cl.
   *B01D 53/02*   (2006.01)
   *B01J 20/00*   (2006.01)
(52) U.S. Cl. .............. 95/96; 95/116; 96/154; 502/400
(58) Field of Classification Search ........ 95/96, 95/116; 96/108, 153, 154; 502/400
   See application file for complete search history.

(56) References Cited

U.S. PATENT DOCUMENTS 4,971,605 A    11/1990  Tarman 5,861,050 A    1/1999  Pittel et al.
6,063,312 A    5/2000  Mannheimer
2002/0061954 A1  5/2002  Davis et al.
2003/0054141 A1 * 3/2003  Worley et al. ............... 428/195

FOREIGN PATENT DOCUMENTS

| DE | 199 54 769 A1 | 1/1998 |
| DE | 196 30 073 A1 | 5/2001 |
| EP | 306 202 A2 | 3/1989 |
| JP | 8-332375 | * 12/1996 |

OTHER PUBLICATIONS

Nelson, G., "Application of microencapsulation in textiles," International Journal of Pharmaceutics, vol. 242, pp. 55-62, XP002251032, (2002).

Xavier, P., "Paraffin/porous-graphite-matrix composite as a high and constant power thermal storage material," International Journal of Heat and Mass Transfer, vol. 44, pp. 2727-2737, XP002251033, (2001).

* cited by examiner

*Primary Examiner*—Robert A Hopkins
(74) *Attorney, Agent, or Firm*—Buchanan Ingersoll & Rooney PC

(57) ABSTRACT

The invention relates to a composite material, a method for controlling the thermal effects generated in a physicochemical process using said material, and applications of the material and the method.

The composite material comprises an active solid and a phase change material. The phase change material takes the form of micronodules having an average size of between 1 micron and 5 millimeters and it is selected from materials with a liquid/solid phase change temperature of between −150° C. and 900° C. The active solid is selected from solids that can be used in a method involving reversible physicochemical processes that are exothermic in one direction and endothermic in the opposite direction.

28 Claims, No Drawings

COMPOSITE MATERIAL AND USE THEREOF FOR CONTROLLING THERMAL EFFECTS IN A PHYSICOCHEMICAL PROCESS

BACKGROUND OF THE INVENTION

1. Field of the invention:

The present invention relates to a composite material, a method for controlling the thermal effects generated in a physicochemical process using said material, and applications of the material and the method.

2. Description of the Related Art

In various technical fields, the methods put into practice are based on a reversible physicochemical process that is exothermic in one direction and endothermic in the other. In this type of method, it is generally desirable to remove the heat liberated during the exothermic step, and it is necessary to supply the heat necessary for the endothermic step to obtain satisfactory results.

The storage of a gas in an adsorbent solid is widely investigated and employed. The adsorption of the gas on the solid is exothermic and the heat liberated has a detrimental effect on adsorption efficiency. Moreover, a reverse problem arises during the desorption of the gas during the regeneration step. In fact, this desorption generates an endothermic effect that is even greater when the regeneration step is carried out at high gas flow rates. This endothermic effect strongly inhibits the desorption of the gas, and the kinetics of the method are accordingly limited by the heat input necessary. The usual solutions consist, in the case of adsorption for example, in removing the heat formed to the exterior, necessitating the use of a very high thermal conductivity material as adsorbent solid. This high thermal conductivity can be obtained by adding expanded natural graphite (ENG) to activated charcoal [S. Biloé, et al., Carbon, 2001, 39(11), 1653-1662)] or by using an ENG-activated charcoal composite prepared by in situ activation (WO01/55054).

The storage of energy on composite materials containing a phase change component has also been investigated. These materials nevertheless present very poor thermal conductivities (about $0.2 \ W \cdot K^{-1} m^{-1}$). In activated charcoal-paraffin composites in which the activated charcoal is impregnated with paraffin, the confinement of the paraffin in the micropores of the activated charcoal inhibits the energy properties of phase change inherent in the paraffin [C. Chapotard, et al., (Entropie 1982; 107-108: 112-121)]. Composite materials comprising expanded natural graphite (ENG) and paraffin have also been described (X. Py, et al, International Journal of Heat and Mass Transfer, 2001, 44, 2727-2737). ENG is impregnated with the paraffin by simple capillarity. The thermal conductivity of this composite corresponds to that of ENG, which then only serves as container and thermal conductor. This composite material does not contain activated charcoal and hence does not display any adsorption capacity. Sweating of the paraffin is also observed during the use of this type of composite.

Patent WO98/04644 teaches a method and a system for storing heat or cold in a composite material comprising an expanded and compressed graphite matrix and a phase change material that can be, in particular, a congruent melting salt. The composite material is obtained by vacuum impregnation of the matrix by a salt solution or by immersion of the matrix in a salt solution. As in the previous case, the objective of this type of material is exclusively to store energy in the form of latent heat, and not to control the thermicity of a physicochemical process combining a gas with an active solid. Also observed is the presence of blooming problems of the phase change material, as in the case of paraffin.

It is well known how to prepare micronodules of various materials. For example, the encapsulation of an odorant (Migrin Oil) is described by K. Hong et al. [Materials Chemistry and Physics, 58 (1999) 128-131]. The encapsulation method consists in contacting a precondensate of melamine and formaldehyde in alkaline medium with an aqueous emulsion of Migrin Oil and 1,4-diaminoanthraquinone (DDA). Furthermore, micronodules of paraffin in a polymer envelope obtained by crosslinking a melamine resin are marketed by BASF AG. [E. Jahns, BASF, "Microencapsulated Phase Change Material", www.ket.kht.se/Avdelningar/ts/annex10/WS_pres/Jahns.pdf]

Composite materials are used in the textile field, comprising fibers of materials conventionally used for textile fibers and micronodules of a phase change material. The micronodules can be grafted onto the fibers or distributed in the mass of material constituting the fibers. [G. Nelson, International Journal of Pharmaceutics. 2002, 242, pp. 55-62].

The problem that the invention proposes to solve is to remedy the inhibiting effect engendered by the heat liberated during the exothermic step and by the heat consumed in the endothermic step in methods involving a reversible physicochemical process that is exothermic in one direction and endothermic in the opposite direction, and which takes place in a solid material. The purpose is to control in situ the thermal effects occurring during the physicochemical process, in order to ensure isothermal operation.

SUMMARY OF THE INVENTION

This is why the subject of the present invention is a composite material comprising an active solid and micronodules, a method for controlling the thermal effects in a method involving a reversible physicochemical process, and various applications of the material.

The composite material according to the invention comprises an active solid and a phase change material and is characterized in that:
  the phase change material takes the form of micronodules having an average size of between 1 micron and 5 millimeters;
  the phase change material is selected from materials with a liquid/solid phase change temperature of between $-150°$ C. and $900°$ C.;
  the active solid is selected from solids that can be used in a method involving reversible physicochemical processes that are exothermic in one direction and endothermic in the opposite direction.
The range of reversible physicochemical processes include the following:
  reversible chemical reactions that are exothermic in the synthesis direction and endothermic in the decomposition direction;
  reversible mechanisms of exothermic adsorption and endothermic desorption of a gas on a solid.

DETAILED DESCRIPTION OF THE PREFERRED EMBODIMENTS

In a composite material according to the invention, the active solid may take the form of particles or monoliths. A monolith consists of a consolidated assembly of several particles and it displays macroscopic cohesion.

Materials that can be used as active solid in a reversible chemical reaction are reactive solids. Examples include various salts such as halides, carbonates and hydroxides. In particular, chlorides such as, for example, $BaCl_2$, LiCl, $CaCl_2$, $MnCl_2$, $NiCl_2$ or bromides such as, for example, $SrBr_2$ react with ammonia or with water; hydroxides such as $Sr(OH)_2$ or $Ba(OH)_2$ react with water; carbonates react with carbon dioxide.

Materials that can be used as active solid in a reversible adsorption are porous and/or microporous solids. Examples include activated charcoals, zeolites, activated alumina and silica gels.

The phase change material can be selected, for example, from paraffins, congruent melting salts and metals. A micronodule consists of said phase change material encapsulated in an envelope of a material adapted to the pressure and temperature requirements of the method for which the use of the micronodules is considered, and compatible with the active solid with which the micronodules are in contact.

Paraffins consist of pure alkanes or mixtures of alkanes with 1 to 100 carbon atoms.

If the liquid/solid phase change material is a salt, it can be selected in particular from hydrated or unhydrated halides such as for example $CaBr_2$, $CaCl_2$, KF, KCl, MgCl, NaCl, NaF, $NH_4Cl$, $NH_4F$, $ZnCl_2.5H_2O$, $KF.4H_2O$, $CaCl.6H_2O$, hydrated or unhydrated carbonates such as for example $LiClO_3.3H_2O$, hydrated or unhydrated sulfates such as for example $MgSO_4$, $ZnSO_4$, $Na_2SO_4$, $Na_2SO_4.10H_2O$, $(NH_4)_2SO_4$, phosphates such as for example $Na_2HPO_4$, $NaH_2PO_4$, $NH_4H_2PO_4$, nitrates such as for example $NH_4NO_3$, $Al(NO_3)_3$, $Ca(NO_3)_2$, $Cd(NO_3)_2$, $KNO_3$, $LiNO_3$, $Mg(NO_3)_2$, $NaNO_3$, $Ni(NO_3)_2$, $Zn(NO_3)_2$, $Zn(NO_3)_2.6H_2O$, $Cu(NO_3)_2$, and hydroxides such as for example $Ba(OH)_2$, NaOH.

Examples of metals that can be used as phase change material include Al, Pb, Cu, Zn and alloys thereof.

Paraffins are a particularly advantageous family of materials because they cover a broad range of liquid/solid phase change temperatures.

Of course, the phase change material is selected as a function of the active solid which is the seat of the reversible physicochemical process, and of the desired phase change temperature.

The respective proportions of active solid and micronodules can be adjusted so that the heat flux generated by the physicochemical process used in the method is totally or partially stored or restored by the liquid/solid phase change.

Similarly, the size of the micronodules used can advantageously be adjusted to the thermal power generated by the physicochemical process.

The composite material according to the invention can be obtained in various forms. In a first embodiment, the material comprises a porous or microporous active solid, in the form of monoliths or particles, the micronodules occupying the pores of the active solid. In a second embodiment, the composite material is a simple mixture of particles or monoliths of active solid and micronodules, the micronodules occupying the spaces between the particles or monoliths of active solid. In a third embodiment, the composite material comprises particles or monoliths of active solid on the surface of which the micronodules are fixed, either by chemical grafting or by bonding with an adhesive. In a fourth embodiment, the particles of active solid (smaller than the micronodules) are fixed on the surface of the micronodules by chemical grafting or by bonding with an adhesive. In a fifth embodiment, the material comprises a mixture of particles of a preferably highly conducting material on which the micronodules are fixed, and particles or monoliths of active solid. In a sixth embodiment, the composite material comprises one or more monoliths of active solid in which the micronodules are distributed.

The composite material may further contain expanded natural graphite. It accordingly takes the form of a matrix consisting of expanded graphite and possibly a mechanical binder, within which the particles of active solid and the micronodules of phase change material are distributed.

The materials proposed are advantageously used in all the methods in which a material is the seat of undesirable thermal effects. They serve to control the thermal effects locally by storing and by liberating the heat produced or demanded by the physicochemical process involved. Thus a method can operate in isothermal mode while it is the seat of endothermic and exothermic mechanisms.

The method according to the invention for controlling thermal effects in a reversible physicochemical process between an active solid and a gaseous compound, said process being exothermic in one direction and endothermic in the opposite direction, is characterized in that the thermal effects are controlled by using a composite material according to the invention as active solid.

The method for preparing the composite material according to the invention depends on the type of active solid and of the micronodules of which it is comprised, on the form in which it is to be used, and on the thermal effects which must be controlled and the dimensional constraints associated with the satisfactory operation of the method for which the composite material is intended.

A composite material according to the invention comprising a simple mixture of particles or monoliths of active solid and micronodules, in which the micronodules occupy the spaces between the particles or the monoliths of active solid, is obtained by mixing the preconstituted micronodules of phase change material and the particles or monoliths of active solid, in order to ensure satisfactory thermal contact.

A composite material according to the invention, comprising a mixture of particles of a preferably highly conducting material on which the micronodules are fixed, and particles or monoliths of active solid, can be obtained by fixing the micronodules, for example by chemical grafting, on said support material and then mixing the grafted support material and the particles or monoliths of active solid in order to ensure satisfactory thermal contact. Carbon fibers represent an advantageous support material.

In a third embodiment, the micronodules, particles or monoliths of active solid, and a liquid adhesive, are mixed. The micronodules are thereby fixed on the particles or monoliths of active solid by bonding. If the size of the particles or monoliths of active solid is larger than that of the micronodules, a composite material is obtained comprising particles or monoliths of active solid on the surface of which the micronodules are fixed. If the size of the particles of active solid is much smaller than that of the micronodules, a composite material is obtained comprising micronodules on the surface of which the particles of active solid are fixed.

It is thus possible to similarly obtain a material comprising particles or monoliths of active solid coated with micronodules or a material comprising micronodules coated with particles of active solid, by using a chemical reagent suitable for chemical grafting between the envelope of the micronodules and the particles or monoliths of active solid.

A composite material comprising one or more monoliths of active solid in which the micronodules are distributed can be obtained by extrusion of a paste obtained by mixing the micronodules, the powdery active solid and a binder, followed by chemical or heat treatment to obtain the composite in solid form.

If the active solid is activated charcoal and the micronodules are micronodules of paraffin, the composite material can be prepared by grafting the micronodules onto the outer surface of the activated charcoal under the following conditions:

microencapsulated paraffin and activated charcoal are placed in suspension in a mixture of melamine and formaldehyde, at a pH of 8 and a temperature of 70° C.;

the pH is then lowered to 4, causing polymerization of the melamine and formaldehyde. Due to its hydrophobic character, the polymer forms a film imprisoning the micronodules on the activated charcoal.

In a variant, the composite material comprising the micronodules and the active solid is mixed with expanded natural graphite (ENG) and the combination is compressed to obtain a block with high mechanical strength, good heat capacity and good thermal conductivity.

The use of a composite material according to the invention is suitable for controlling the thermal effects at three levels during a method using a reversible physicochemical process, that is, the operating temperature level of the method is stabilized at the melting point of the phase change material used, the quantity of energy controlled corresponds to the quantity of phase change material used, and the size of the micronodules is imposed by the thermal power that must be controlled.

The materials proposed are advantageously used in methods in which a reversible mechanism generates heat during an exothermic step and consumes heat during an endothermic step, thereby respectively increasing and decreasing the temperature of the active solid where the mechanism occurs, thereby making it deviate from the operating conditions that must be satisfied to obtain the optimal performance of the overall method.

The materials proposed in the present invention provide an advantageous solution for maintaining the active solid at a substantially constant temperature close to the melting point of the phase change material used. Regardless of the method for preparing the composite, the use of the phase change material in the form of micronodules permits a rapid and uniform collection of the heat produced during the exothermic phase, said heat thus stored then being usable for the endothermic phase as required.

The composite materials according to the invention can advantageously be used as adsorbent beds in methods for purifying a gas mixture, according to the method called PSA (pressure swing adsorption), in which one of the gases is separated from the mixture by adsorption and regeneration by pressure modulation. Such a process consists in carrying out the successive steps of pressurization and depressurization of an adsorbent bed by the gas mixture to be processed. The adsorption step, corresponding to pressurization, is exothermic. The desorption (regeneration) step, corresponding to depressurization, is endothermic. If the material of which the adsorbent bed is comprised is a composite material according to the invention, the heat produced in the exothermic step is absorbed by the phase change material of the composite material, so that this step occurs at constant temperature. Then, the regeneration phase, which is endothermic and which corresponds to the desorption of certain components of the gas mixture, is carried out by using the heat restored by the phase change material. This regeneraton step is hence also isothermal. A further subject of the present invention is consequently a method for purifying a gas mixture by adsorption and regeneration by pressure modulation, called the PSA method, consisting in carrying out the successive steps of pressurization and depressurization of at least one adsorbent bed by a gas mixture, in order to separate the gas mixture, said method being characterized in that the adsorbent bed(s) comprise(s) a composite material according to the invention.

The PSA method for the treatment of a gas mixture is particularly useful for obtaining hydrogen from a gas mixture, particularly from a gas mixture produced by methane reforming. This method is described in particular by Warmuzinski K. and Tanczyk M., (Chem. Eng Pro. 1997; 36:89-99). The average composition of the gas mixture issuing from methane reforming is 70% $H_2$, 22% $CO_2$, 3% Co, 3% $CH_4$ and 2% $N_2$. The gases are separated by means of two fixed adsorbent beds placed in series. The bed of a first column traversed by the gas mixture to be processed comprises an activated charcoal/micronodules composite material according to the invention, the activated charcoal trapping $CO_2$ and $CH_4$ during the adsorption phase. The bed of the second column comprises a zeolite/micronodules composite material according to the invention, the zeolite adsorbing the traces of CO and nitrogen present in the mixture. The use of paraffin micronodules is particularly advantageous. At the outlet of the columns, the $H_2$ content is at least 99.9%. The heat liberated by the steps of adsorption of $CO_2$ and $CH_4$ in the first column, and of CO and $N_2$ in the second column, is stored in the paraffin micronodules in the form of latent heat of fusion, and is then used for the desorption of the gases during the regeneration steps in the columns. Several sets of columns are used to obtain continuous production of $H_2$. A further subject of the present invention is consequently a method for obtaining purified hydrogen from a gas mixture by adsorption and regeneration by pressure modulation, called the PSA method, as described above, said method being characterized in that the gas mixture to be processed is a hydrogen-rich mixture further containing $CO_2$ and $CH_4$, and in that said mixture passes successively through two adsorbent beds, the first comprising activated charcoal and micronodules of phase change material, the second comprising zeolite and micronodules of phase change material, with paraffin being particularly preferred.

The PSA method for the treatment of a gas mixture is further extremely advantageous for removing most of the water vapor present in the air without requiring heat treatment. Conventionally, such a method, called "air drying", consists in passing the air to be dried over alumina or zeolite in a fixed bed in a column, and it is put into practice adiabatically in the prior art. The heat of adsorption travels in the column in the form of a faster front than the mass transfer front. The technique employed consists in using a sufficiently long bed (between 1 and 2 m) so that the heat front is maintained in the bed. Thus the corresponding heat is available for the countercurrent purge gas while minimizing the necessary quantity of purge gas. If the bed is too short, a portion of the heat of adsorption is lost and a larger quantity of purge gas is necessary. The cyclic operation of the method, combined with the need to maintain the thermal front in the bed, requires limiting the penetration of the (slower) concentration front to a relatively short distance from the bed inlet. This penetration depth depends on the moisture content, the cycle time and the adsorbent used. On the whole, the (oscillating) movement of the thermal front at the end of the bed presents a greater amplitude than that of the concentration front. Thus more than half of the bed downstream only operates as thermal ballast controlling the thermicity of the method by sensible heat, which is less effective than control by latent heat. In the PSA method for drying air, the use of a composite material according to the invention as adsorbent bed serves to ensure isothermal operation and consequently to reduce the size of the bed, because the column containing the adsorbent material operates as adsorbent along its whole length and under better conditions. The effective capacity of the installation is thereby improved. In consequence, a further subject of the present invention is a method for drying air by a PSA method as described above, said method being characterized in that the gas mixture to be processed is air containing water vapor, and in that the adsorbent bed is a composite material according to the invention in which the active solid is an alumina or a zeolite, and the micronodules are paraffin micronodules.

Gas storage (natural gas, $H_2$ or $CO_2$ for example) can be carried out by causing said gas to be adsorbed on an appropriate solid adsorbent (S. Biloé, V. Goetz, A. Guillot, Carbon, Vol. 40, pp. 1295-1308, 2002) under conditions such that the adsorption is reversible. This mechanism is exothermic in the adsorption direction and endothermic in the desorption direction. The generation of heat during the adsorption step, like the consumption of heat during the desorption step, have detrimental effects on the yield of the operation (S. Biloé, V. Goetz, S. Mauran, AIChE J., Vol. 47, pp. 2819-2830, 2001). The use of a composite material according to the invention as adsorbent solid serves to carry out the adsorption step under isothermal conditions, without using a device to remove the heat to the exterior, but by storing it in the form of latent heat of phase change. This stored heat is then used to maintain a constant temperature during the regeneration step, which is endothermic. This is why a further subject of the present invention is a method for storing gas by reversible adsorption on a porous solid, characterized in that the porous solid is a composite material according to the present invention, in which the active solid is a porous or a microporous solid. Zeolites and activated charcoal are particularly advantageous as active solid in this method.

The production of oxygen by separating the components of air is achieved by cryogenic distillation, by a PSA method on zeolites 5A or 13X, or by a method called VSA (vacuum swing adsorption). The VSA method is similar to the PSA method described above, except as regards the regeneration step, which is carried out under vacuum and not simply under reduced pressure with scavenging by a purge gas. In the PSA and VSA methods, the oxygen is fixed on the adsorbent. The VSA method is mainly controlled by the sorption properties of the adsorbent, the influence of the mass transfer kinetics being substantially less [Budner Z., et al., Study and modelling of the vacuum swing adsorption (VSA) process employed in the production of oxygen, *Chemical Engineering Research and Design*, Volume 77, Issue 5, 1999, Pages 405-412]. Furthermore, during the application of a VSA method, it is important to reduce the effect of a cold point detrimental to the performance of the method. The steady state conditions of the cyclic temperature profile of the process are established very slowly (about 1000 cycles or 12 to 15 hours), making it difficult to optimize and hence to control the method [Wilson S. J., et al., Cyclic steady-state axial temperature profiles in multilayer, bulk gas PSA—The case of oxygen VSA, *Industrial and Engineering Chemistry Research*, Volume 41, Issue 11, 29 May 2002, Pages 2753-2765]. The temperatures vary locally in sinusoidal mode with an amplitude of 5° C. and axially in the bed with an amplitude of 40° C., the upper temperature being 290 K. It thereby appears that the optimization and control of the method are considerably facilitated by isothermal operation. Furthermore, since the method is controlled by the adsorption characteristics of the adsorbent, isothermal operation at 290 K would be beneficial for the effective capacity of the bed. The use of composite materials according to the invention serves to obtain such isothermal operation. A composite material comprising a bed of zeolite particles (5A, 13X ou CaX) and paraffin micronodules having a phase change temperature close to 290 K (17° C.) is particularly appropriate. This is why a further subject of the present invention is a method for extracting oxygen from air by adsorption and regeneration by pressure modulation, called the VSA method, consisting in carrying out the successive steps of pressurization by air and placing an adsorbent bed under vacuum, said method being characterized in that the adsorbent bed comprises a composite material according to the invention, said material preferably comprising a zeolite and paraffin with a phase change temperature close to 290 K. Hexadecane, pentadecane and heptadecane, which have melting points of 291.25 K, 283.05 K and 295.05 K respectively, can be used advantageously as paraffin.

The invention claimed is:

1. A composite material comprising an active solid and a phase change material, wherein:
   the phase change material takes the form of micronodules having an average size of between 1 micron and 5 millimeters;
   the phase change material is selected from materials with a liquid/solid phase change temperature of between −150° C. and 900° C.;
   the active solid is selected from solids that can be used in a method involving reversible physicochemical processes that are exothermic in one direction and endothermic in the opposite direction,
   wherein the composite material comprises a mixture of particles or monoliths of the active solid, and the micronodules.

2. The composite material as claimed in claim 1 wherein the active solid comprises a porous and/or microporous solid that can be used in a reversible adsorption process.

3. The composite material as claimed in claim 2, wherein the porous and/or microporous active solid is selected from activated charcoals, zeolites, activated alumina or silica gels.

4. The composite material as claimed in claim 1, wherein the phase change material is a congruent melting salt.

5. The composite material as claimed in claim 4, wherein the congruent melting salt is selected from hydrated or unhydrated halides, hydrated or unhydrated carbonates, hydrated or unhydrated sulfates, phosphates, nitrates or hydroxides.

6. The composite material as claimed in claim 5, wherein the congruent melting salt is selected from $CaBr_2$, $CaCl_2$, KF, KCl, MgCl, NaCl, NaF, $NH_4Cl$, $NH_4F$, $ZnCl_2.5H_2O$, $KF.4H_2O$, $CaCl.6H_2O$, $LiClO_3.3H_2O$, $MgSO_4$, $ZnSO_4$, $Na_2SO_4$, $Na_2SO_4.10H_2O$, $(NH_4)_2SO_4$, $Na_2HPO_4$, $NaH_2PO_4$, $NH_4H_2PO_4$, $NH_4NO_3$, $Al(NO_3)_3$, $Ca(NO_3)_2$, $Cd(NO_3)_2$, $KNO_3$, $LiNO_3$, $Mg(NO_3)_2$, $NaNO_3$, $Ni(NO_3)_2$, $Zn(NO_3)_2$, $Zn(NO_3)_2.6H_2O$, $Cu(NO_3)_2$, $Ba(OH)_2$ or NaOH.

7. The composite material as claimed in claim 1, wherein the phase change material is a metal.

8. The composite material as claimed in claim 7, wherein the metal is selected from Al, Pb, Cu, Zn and alloys thereof.

9. The composite material as claimed in claim 1, wherein the composite material comprises a porous or microporous active solid, in the form of monoliths or particles, the micronodules occupying the pores of the active solid.

10. The composite material as claimed in claim 1, wherein the composite material is formed by mixing particles or monoliths of active solid and micronodules, the micronodules occupying the spaces between the particles or the monoliths of active solid.

11. The composite material as claimed in claim 1, wherein the composite material comprises particles or monoliths of active solid on the surface of which the micronodules are fixed, either by chemical grafting or by bonding with an adhesive.

12. The composite material as claimed in claim 1, wherein the composite material comprises particles of active solid fixed on the surface of the micronodules by chemical grafting or by bonding with an adhesive.

13. The composite material as claimed in claim 1, wherein the composite material comprises a mixture of particles or monoliths of active solid, and particles of a support material on which the micronodules are fixed.

14. The composite material as claimed in claim 1, wherein the composite material comprises one or a plurality of monoliths of active solid in which the micronodules are distributed.

15. The composite material as claimed in claim 1, wherein the composite material further contains expanded natural graphite.

16. A method for controlling thermal effects in a reversible physicochemical process between an active solid and a gaseous compound, said process being exothermic in one direction and endothermic in the opposite direction, comprising controlling the thermal effects by using a composite material as claimed in claim 1 as active solid.

17. A method for purifying a gas mixture by adsorption and regeneration by pressure modulation, called the PSA method, comprising carrying out the successive steps of pressurization and depressurization of at least one adsorbent bed by a gas mixture, in order to separate the gas mixture, wherein the adsorbent bed(s) comprise(s) a composite material as claimed in claim 1.

18. The method as claimed in claim 17, for obtaining purified hydrogen from a gas mixture, wherein the gas mixture to be processed is a hydrogen-rich mixture further containing $CO_2$ and $CM_4$, and in that said mixture passes successively through two adsorbent beds, the first comprising activated charcoal and micronodules of phase change material, the second comprising zeolite and micronodules of phase change material.

19. The method as claimed in claim 17, for drying air, wherein the gas mixture to be processed is air containing water vapor and in that the adsorbent bed is a composite material comprising an alumina or a zeolite, and the micronodules are paraffin micronodules.

20. A method for storing gas by reversible adsorption on a porous solid, wherein the porous solid is a composite material as claimed in claim 2.

21. The method as claimed in claim 20, wherein the composite material comprises zeolite or activated charcoal.

22. A method for extracting oxygen from air by adsorption and regeneration by pressure modulation, called the VSA method, comprising carrying out successive steps of pressurization by air and of placing an adsorbent bed under vacuum, wherein the adsorbent bed comprises a composite material as claimed in claim 1.

23. The method as claimed in claim 22, wherein said material comprises a zeolite and a paraffin with a phase change temperature of about 290K.

24. A composite material comprising an active solid and a phase change material, wherein:
the phase change material takes the form of micronodules having an average size of between 1 micron and 5 millimeters;
the phase change material is selected from materials with a liquid/solid phase change temperature of between −150° C. and 900° C.;
the active solid is selected from solids that can be used in a method involving reversible physicochemical processes that are exothermic in one direction and endothermic in the opposite direction,
wherein the active solid comprises a reactive solid that can be used in a reversible chemical reaction,
wherein the composite material comprises a mixture of particles or monoliths of the active solid, and the micronodules.

25. The composite material as claimed in claim 24, wherein the active solid comprises a porous and/or microporous solid that can be used in a reversible adsorption process.

26. The composite material as claimed in claim 24, wherein the reactive solid is selected from halides, carbonates or hydroxides.

27. A composite material comprising an active solid and a phase change material, wherein:
the phase change material takes the form of micronodules having an average size of between 1 micron and 5 millimeters;
the phase change material is selected from materials with a liquid/solid phase change temperature of between −150° C. and 900° C.;
the active solid is selected from solids that can be used in a method involving reversible physicochemical processes that are exothermic in one direction and endothermic in the opposite direction,
wherein the phase change material is a paraffin or a mixture of paraffins,
wherein the composite material comprises a mixture of particles or monoliths of the active solid, and the micronodules.

28. The composite material as claimed in claim 27, wherein the active solid comprises a porous and/or microporous solid that can be used in a reversible adsorption process.

* * * * *